United States Patent
Ebata

(10) Patent No.: US 7,756,523 B2
(45) Date of Patent: Jul. 13, 2010

(54) MANAGEMENT METHOD, SYSTEM, AND MANAGEMENT APPARATUS OF RADIO COMMUNICATION SYSTEM

(75) Inventor: Koichi Ebata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/957,590

(22) Filed: Oct. 5, 2004

(65) Prior Publication Data

US 2005/0090263 A1 Apr. 28, 2005

(30) Foreign Application Priority Data

Oct. 8, 2003 (JP) ............................. 2003-348936

(51) Int. Cl.
*H04Q 7/20* (2006.01)
*H04B 1/06* (2006.01)

(52) U.S. Cl. ....................... 455/453; 455/446; 455/230

(58) Field of Classification Search ................. 455/453, 455/445, 436, 456.3, 69, 522, 446; 370/328, 370/252, 230, 400, 311, 318; 709/225; 375/130
See application file for complete search history.

(56) References Cited

U.S. PATENT DOCUMENTS

| | | | |
|---|---|---|---|
| 5,666,356 A * | 9/1997 | Fleming et al. ............. 370/328 |
| 5,987,328 A | 11/1999 | Ephremides et al. | |
| 6,055,433 A | 4/2000 | Yuan et al. | |
| 6,173,187 B1 * | 1/2001 | Salonaho et al. ............. 455/453 |
| 6,445,925 B1 * | 9/2002 | Kwon et al. ................. 455/446 |
| 6,499,006 B1 | 12/2002 | Rappaport et al. | |
| 6,522,888 B1 * | 2/2003 | Garceran et al. .......... 455/456.3 |
| 6,553,233 B1 * | 4/2003 | Lee et al. ..................... 455/446 |
| 6,594,495 B2 * | 7/2003 | Salonaho et al. ............. 455/453 |
| 6,671,512 B2 * | 12/2003 | Laakso ........................ 455/453 |
| 6,748,222 B1 * | 6/2004 | Hashem et al. ............. 455/453 |
| 7,072,663 B2 * | 7/2006 | Ramos et al. ................ 455/453 |
| 2001/0009853 A1 | 7/2001 | Arimitsu | |
| 2001/0033600 A1 * | 10/2001 | Yang et al. ................... 375/130 |

(Continued)

FOREIGN PATENT DOCUMENTS

CN 1147189 A 4/1997

(Continued)

OTHER PUBLICATIONS

English translation of Chinese Office Action issued Jan. 6, 2006.

*Primary Examiner*—Charles N Appiah
*Assistant Examiner*—Kiet Doan
(74) *Attorney, Agent, or Firm*—Dickstein Shapiro LLP

(57) ABSTRACT

A managing server 1 and a propagation characteristic computing server 3 grasp a load situation for each cell that is a coverage range of each of a plurality of APs 4a to 4d, calculate an evaluation value defined for evaluating the load situation, and take a control of the load situation of each cell so that this evaluation value is minimized. The control of load situation is a control for altering a shape (including size) of each cell, and further, specifically, a control for making a cell alteration so that the above-mentioned evaluation value is minimized, by performing processes such as regulation of the transmission power of the AP, alteration of the installation position of the AP and addition of the AP. This allows the load of each cell (AP) to be regulated most suitably.

25 Claims, 13 Drawing Sheets

U.S. PATENT DOCUMENTS

| | | | |
|---|---|---|---|
| 2002/0022487 A1* | 2/2002 | Ahn | 455/453 |
| 2002/0042276 A1* | 4/2002 | Hakalin et al. | 455/453 |
| 2002/0129138 A1 | 9/2002 | Carter | |
| 2003/0003921 A1* | 1/2003 | Laakso | 455/453 |
| 2003/0040318 A1 | 2/2003 | Fattouch | |
| 2003/0050063 A1 | 3/2003 | Faerber | |
| 2003/0214915 A1* | 11/2003 | Ishikawa | 370/252 |
| 2004/0039817 A1* | 2/2004 | Lee et al. | 709/225 |
| 2004/0203779 A1* | 10/2004 | Gabara | 455/436 |
| 2004/0235481 A1* | 11/2004 | Shimizu | 455/445 |

FOREIGN PATENT DOCUMENTS

| | | | |
|---|---|---|---|
| CN | 1352497 A | | 6/2002 |
| EP | 0 431 956 A2 | | 6/1991 |
| EP | 0 762 791 A2 | | 3/1997 |
| EP | 0 781 064 A2 | | 6/1997 |
| EP | 1 117 265 A1 | | 7/2001 |
| GB | 2 299 916 A | | 10/1996 |
| JP | 5-259967 | | 10/1993 |
| JP | 08-289366 | | 11/1996 |
| JP | HEI 10-093616 | | 4/1998 |
| JP | 2001-94502 | | 4/2001 |
| JP | 2001-197549 | | 7/2001 |
| JP | 02002326784 A | * | 3/2002 |
| JP | 2002-185458 | | 6/2002 |
| JP | 2002-223218 | | 8/2002 |
| JP | 2003-70050 | | 3/2003 |
| JP | 2003-111133 | | 4/2003 |
| JP | 2003-114911 | | 4/2003 |
| JP | 2003-244161 | | 8/2003 |
| JP | 02004350052 A | * | 12/2004 |
| JP | 2005-506721 | | 3/2005 |
| WO | WO-96/28947 A1 | | 9/1996 |
| WO | WO-01/37446 A1 | | 5/2001 |
| WO | WO-02/09464 A1 | | 1/2002 |
| WO | WO-02/30133 A2 | | 4/2002 |
| WO | WO 02/073890 A2 | | 9/2002 |

* cited by examiner

"MOVE AP-2 TO COORDINATE (X2, Y2, Z2)"

"MOVE AP-3 TO COORDINATE (X3, Y3, Z3)"

"ADD AP 4d TO COORDINATE (X4, Y4, Z4) WITH TRANSMISSION
POWER P AND CHANNEL C"

MANAGEMENT METHOD, SYSTEM, AND MANAGEMENT APPARATUS OF RADIO COMMUNICATION SYSTEM

BACKGROUND OF THE INVENTION

The present invention relates to a management method, a system, and a management apparatus of a radio communication system, and further a program for its operational control, and more particularly to a control management technique of a load situation in a wireless LAN (Local Area Network) including a plurality of wireless base stations.

In a wireless LAN system that is comprised of a plurality of wireless LAN access points (AP), there has been conventionally known a load balancing control of avoiding a situation where communication loads are concentrated in a specific AP to enhance communication performance of the entirety of the system. A traffic amount that one AP can accommodate is limited, so in a case where an excessive load was applied to one AP, the communication performance (a throughput characteristic and a delay characteristic) declines in terminals connected to the above AP. So as to avoid it, in a patent document 1 was described the control technique in which each AP grasped the number of the terminals connected to its own AP and gave the terminals under connection an instruction for making a changeover of the connection to other AP in a case where the number of the terminals connected to its own AP was more than a pre-set connectable terminal number, thereby to carry out the load distribution.

In the technology of this patent document 1 (JP-P2002-185458A), the control was taken by monitoring operational information in real time, assuming that the traffic amount (load) that each terminal transmits/receives was equal. That is, assuming that in a case where the number of the terminals connected to one AP is equal to or more than the specified terminal number, the traffic beyond the processing ability of the above AP could occurs, a control of restricting the number of the connectable terminals is taken so that an overload situation can be avoided beforehand.

Also, a reference to a patent document 2 (JP-P1996-289366A) was made, in which a technology was disclosed of, in a mobile communication system having a plurality of wireless base stations connected to a switchboard and capable of accommodating wireless telephones within a cell that is a wireless service area, by monitoring running situations of a plurality of the wireless base stations by the switchboard to compare it with a base station status pattern table stored in the switchboard, to give an instruction for a radio wave radiation characteristic, transmission power and a receiving sensitivity of each wireless base station responding to this comparison result, thereby to automatically control a cell configuration of the wireless base station responding to the operational situation of the system, and to eliminate occurrence of a call loss.

Utilizing the technology disclosed in the foregoing patent document 1 causes the following problems to occur. At first, only if all terminals within the wireless LAN system corresponded to the load balancing control of the above technology, the above technology works effectively. That is, a necessity occurs for adding to the inside of all terminals a function of performing a process according to a request for connection to other AP. Thus, causing the above control to work necessitates that each terminal under the system be a terminal that corresponds to the above control, which is not only costly, but also inconvenient in that the conventional appliances are impossible to use.

Also, it is considered that the load in the wireless LAN system, which depends upon a utilizing method of each location within the area, a layout of utensils, etc., becomes high routinely in the area in which many users exist routinely. In the load balancing control technique as disclosed in the patent document 1, the load is monitored and controlled in real time, whereby the load balancing control is frequently taken in the area in which the load is high routinely. In this control technique, the control is frequently taken because peculiar control messages are exchanged between the AP and each of the terminals, which causes an amount of this control messages to be increased and incurs a decline in performance. Also, it can be thought that the high load status of each AP can be essentially removed by increasing the installation position of the AP or the number of the installed AP for the area in which the load is high routinely, responding to a deviation of the users that depended upon a utilizing method of the above area, the layout of the utensils, etc.; however as a matter of fact, it is impossible to do so with the method as disclosed in the patent document 1.

Further, there is a case of coming into the overload situation when the load that occurred in each terminal is high even though the terminal number is small because the load is assumed to be proportional to the terminal number.

In the technology of the foregoing patent document 2 was not disclosed a concrete realization example for taking a alteration control of the cell configuration of each wireless base station, whereby the problem exists that it is entirely unclear whether an alteration to the really-targeted cell configuration is possible.

SUMMARY OF THE INVENTION

An objective of the present invention is to provide a management method, a system and a management apparatus of a radio communication system enabling the control of the load situation of the AP at a low cost and by lessening an introduction barrier, and also enabling essential removal of the high load status, and further a program for its operational control.

Another objective of the present invention is to provide a management method, a system and a management apparatus of a radio communication system capable of obtaining the optimum cell configuration by taking the control of the load situation of the AP based upon a predetermined load evaluation value, and further a program for its operational control.

The management method of the present invention, which is a management method of a radio communication system including a plurality of wireless base stations, said management method comprising: a first step of grasping a load situation for each cell that is a coverage range of each of said plurality of said wireless base stations; and a second step of calculating a load evaluation value defined for evaluating said load situation of said wireless base stations based on said load situation and controlling said load situation based on said calculated load evaluation value.

Another management method of the present invention, which is a management method of a radio communication system including a plurality of wireless base stations, said management method comprising: a first step of grasping a load situation for each cell that is a coverage range of each of said plurality of said wireless base stations; and a second step of finding such a cell shape that said load situation of each said cell becomes suitable.

The management system of the present invention, which is a management system of a radio communication system including a plurality of wireless base stations, said management system comprising: a first means for grasping a load situation for each cell that is a coverage range of each of said plurality of said wireless base stations; and a second means for calculating a load evaluation value defined for evaluating said load situation of said wireless base stations based on said load situation and controlling said load situation based on said calculated load evaluation value.

Another management system of the present invention, which is a management system of a radio communication system including a plurality of wireless base stations, said management system characterized in grasping a load situation for each cell that is a coverage range of each of said plurality of said wireless base stations to find such a cell shape that said load situation of each said cell becomes suitable.

The management apparatus of the present invention, which is a management apparatus of a radio communication system including a plurality of wireless base stations, said management apparatus comprising: means for, based on a load situation for each cell that is a coverage range of each of said plurality of said wireless base stations, calculating a load evaluation value defined for evaluating said load situation of said wireless base stations and means for controlling said load situation based on said load evaluation value.

Another management apparatus of the present invention, which is a management apparatus of a radio communication system including a plurality of wireless base stations, said management apparatus comprising: means for grasping a load situation for each cell that is a coverage range of each of said plurality of said wireless base stations and means for finding such a cell shape that said load situation of each said cell becomes suitable.

The program of the present invention, which is a program for causing a computer to execute an operation of a management apparatus of a radio communication system including a plurality of wireless base stations, said program comprising a process of, based on a load situation for each cell that is a coverage range of each of said plurality of said wireless base stations, calculating a load evaluation value defined for evaluating said load situation of said wireless base stations to control said load situation based upon this calculation result.

Another program of the present invention, which is a program for causing a computer to execute an operation of a management apparatus of a radio communication system including a plurality of wireless base stations, said program comprising a process of grasping a load situation for each cell that is a coverage range of each of said plurality of said wireless base stations to find such a cell shape that said load situation of each said cell becomes suitable.

An operation of the present invention is described as follows. At first, traffic load information of each cell which is accommodated by each AP is gathered. Then a load evaluation value defined for evaluating the load situation is calculated. Finally, the control of the load situation of each cell is taken so that this evaluation value is minimized. Practical methods for the control of the load situation are control for altering a shape (including size) of each cell. More, specifically, the control methods for making an alteration of the cell shape so that the above-mentioned evaluation value is minimized are performing processes such as controlling transmission power of APs, alteration of the installation position of APs, and addition of APs. This allows the load of each cell (AP) to be regulated most suitably.

In accordance with the present invention, the effect exists that the most suitable control of the load situation is enabled because a configuration was made so that the coverage range of each AP was changed by controlling the load situation of each cell, i.e. the control of the cell shape by the alteration of the transmission power of the AP, or the installation position alteration of the AP, or the addition of the AP based upon a load evaluation value. Also, there is no necessity for providing a mechanism for control on the terminal because the control is taken only on the AP side, thus making it possible to use the existing appliances as they stand, whereby the load balancing control of which the cost is low, and of which the introduction barrier is small can be taken.

Also, in accordance with the present invention, the effect also exists that controlling a time granularity gathering the load situation also makes it possible to correspond to a constant overload because a temporary countermeasure is not taken, but measures of the alteration of the transmission power of the AP, the alteration of the installation position of the AP, and the addition of the AP are taken, upon grasping the load station. In such a manner, the control of the present invention which is executed based upon the gathering long term load information eliminates the possibility that a control is frequently taken for constant load area, whereby a performance decline due to an increase of responding processes is eliminated.

Further, in accordance with the present invention, ineffectiveness for the overload situation can be avoided because it is intended that the load evaluation value is calculated based on the actual load situation, not on the load set in a fixed manner terminal by terminal.

BRIEF DESCRIPTION OF THE DRAWINGS

This and other objects, features and advantages of the present invention will become more apparent upon a reading of the following detailed description and drawings, in which.

DETAILED DESCRIPTION OF THE INVENTION

Figure 1:
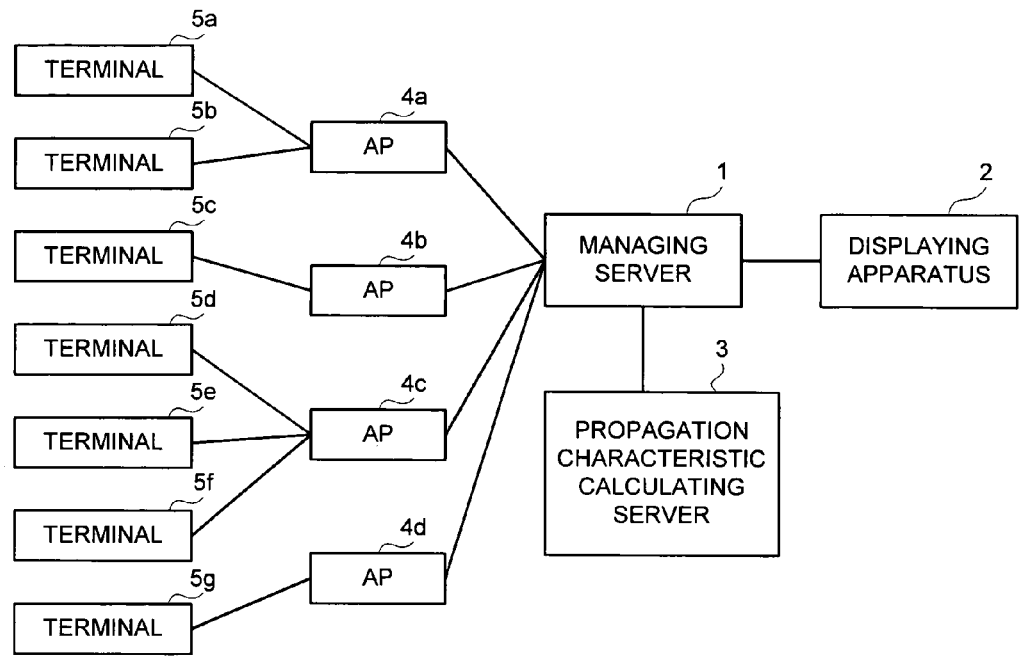
FIG. 1 is a view illustrating the entirety of one embodiment of present invention.

Next, embodiments of the present invention will be explained, by employing the accompanied drawings. A reference to FIG. 1 is made, in which the embodiment of the present invention is configured of a managing server 1, a displaying apparatus 2, a propagation characteristic computing server 3, access points (APs) 4a to 4d, and terminals 5a to 5g. The managing server 1 collects or sets information from the APs 4a to 4d and the terminals 5a to 5g, makes an analysis for controlling the load situation, provides display contents for the displaying apparatus 2, requests the propagation characteristic calculating server 3 for computation, and acquires its result.

The displaying apparatus 2 makes an information display to a wireless LAN administrator based on the information provided by the managing server 1. The propagation characteristic calculating server 3 calculates the position of the AP and the radio wave propagation characteristic at an arbitrary location on the service area responding to request by the managing server 1, and provides its result for the managing server 1. The APs 4a to 4d and the terminals 5a to 5g, which are a wireless LAN device respectively, provide or alter statistic information such as setting information and load information responding to request by the managing server 1.

There is also a case where the terminals 5a to 5g do not have a function of providing or altering the information. Additionally, the APs 4a to 4d, the managing server 1, the managing server 1, the displaying apparatus 2, the managing server 1 and the propagation characteristic calculating server 3 may exist in an identical network respectively, and may be remotely connected via a communication network such as an internet respectively.

Figure 2:
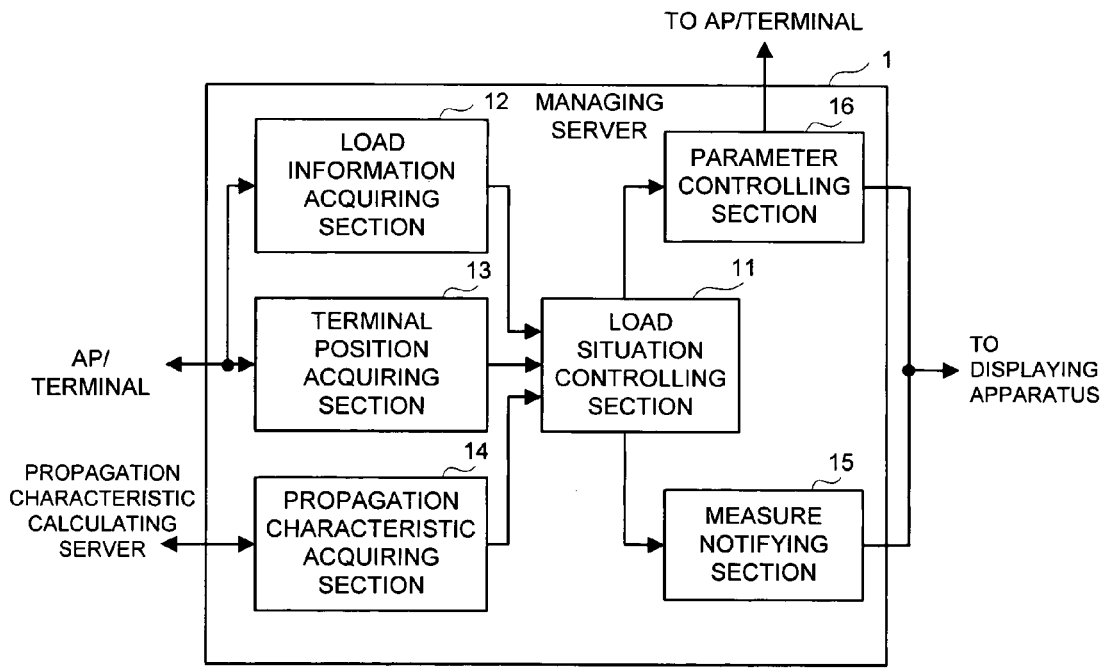
FIG. 2 is a detailed view of the managing server.

FIG. 2 has a configuration of the managing server 1 described in more details. The managing server 1 is configured of a load situation controlling section 11, a load information acquiring section 12, a terminal position acquiring section 13, a propagation characteristic acquiring section 14, a measure notifying section 15, and a parameter controlling section 16. The load situation controlling section 11 decides a process for controlling the load situation based on the propagation characteristic from each AP within the system to an arbitrary location and the collected load information. As the controlling process of the load situation, for example, are listed the control of a parameter such as the transmission power that does not go through a hand of the administrator, the alteration of the AP installation position, the measure such as the addition of the AP that demands an operation of the administrator or the like.

The load information acquiring section 12 acquires information (referred to as load information) associated with the load from the APs 4a to 4d or the terminals 5a to 5g responding to a necessity, calculates the load situation indicating the current situation of the load, and provides it for the load situation controlling section 11. As this load information, there are, for example, the number of the terminals associating to the AP, a transmission request packet amount of each device, a received packet amount of each device, a use transfer velocity, and a wireless medium activity ratio. The information responding to the time granularity to be requested (for example, second by second, hour by hour, day by day, etc.) is provided. The terminal position acquiring section 13 acquires the above position information from the terminals capable of acquiring the position information, and supplies it to the load situation controlling section 11. The terminal position acquiring section 13 does not operate in a case where the position information is impossible to acquire from the terminals.

The propagation characteristic acquiring section 14 acquires the propagation characteristic calculated by the propagation characteristic calculating server 3, and supplies it to the load situation controlling section 11. With regard to the load situation control decided by the load situation controlling section 11, which requires an operation of the administrator, the measure notifying section 15 prepares and supplies information for notifying its effect to the displaying apparatus 2. The parameter controlling section 16 notifies resetting of the parameter of the AP or the terminal to the AP and the terminal in order to take the load situation control decided by the load situation controlling section 11, which does not require the operation of the operation administrator, prepares information for notifying its effect to the administrator, and supplies it to the displaying apparatus 2.

Figure 3:
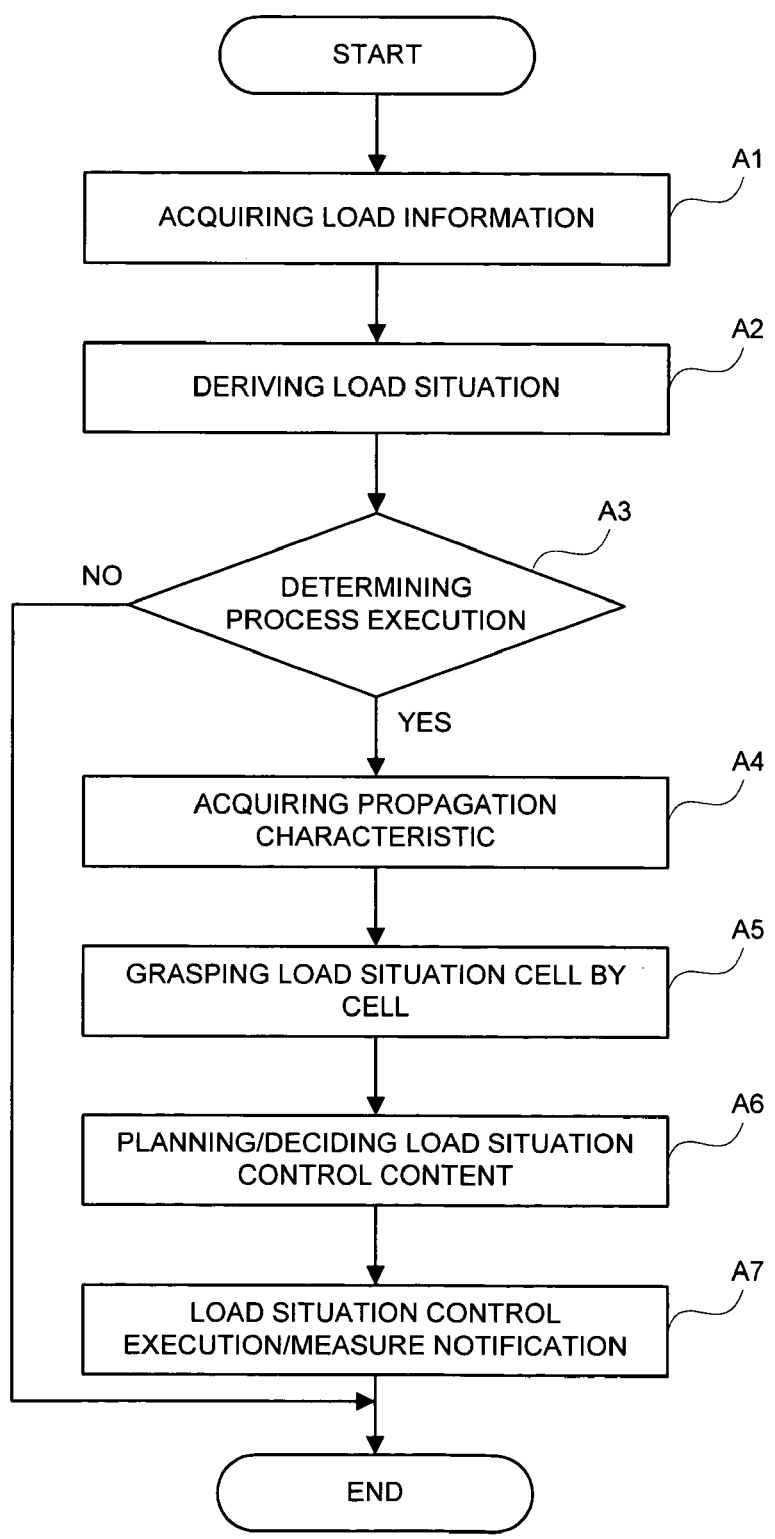
FIG. 3 is a flowchart of one embodiment of the present invention.

FIG. 3 is a view illustrating a general schematic-process flow of the embodiment of the present invention. The process flow of the embodiment of the present invention will be explained, by employing FIG. 3. A step A1 is an acquiring process of the load information, in which the load information is regularly acquired from the wireless LAN devices (the AP and the terminal) under operation. This process is performed in order to grasp the traffic load of each wireless LAN device, or each set of one AP and the terminals to be associated to its AP.

The acquiring process of the load information is performed as follows. The load information acquiring section 12 of the managing server 1 employs an operation protocol (for example, an SNMP: Simple Network Management Protocol), thereby to acquire the load information from the AP that is a wireless LAN device under operation, or from both of the AP and the terminal. The load information acquiring section 12 works the acquired information responding to a necessity, and derives it as a load situation (step A2). For example, it acquires a total of received packet amounts of a certain AP and terminals connected to its AP and the use transfer velocity respectively, and computes a medium activity time by dividing the received packet amount by the transfer velocity. And, a ratio of the above medium activity time and the total time is regarded as a medium activity ratio, which is derived as a load situation.

In this step, changing the time interval at the moment of regularly acquiring the load information makes it possible to change the time granularity of the load situation that can be grasped. Making a setting so that the time interval is short makes it possible to acquire information that follows in the wake of a drastic change in the traffic. The constant overload is easily detected by making a setting so that the time interval is long because making the time interval long enables the situation of the average traffic to be grasped. In such a manner, the time interval to be acquired is one that is decided depending upon what the load situation control that the administrator desires should be, and controlling the time interval responding to fluctuation in the load enables the more accurate control of the load situation. For example, the control is also possible of altering the time interval depending upon time in such a manner that the time interval is set to short the time of which the load fluctuation period is short (for example day time etc.), and conversely, the time interval is set to long in the time of which the load fluctuation period is long (for example night etc.). On the other hand, it is also possible to simultaneously perform the process of which the time interval is short and the process of which the time interval is long in parallel.

A step A3, which is a process execution determining process, is a process of deciding whether or not the process of the load situation control is performed on the basis of the load situation derived in the step A2. In a case where the load situation derived in the step A2 meets a predetermined condition, it is determined that the load concentration has occurred, so the processes subsequent to a step A4 are performed. As an example of the condition for determining the load concentration, the following condition is defined in the steps 1A and A2 for example; the regularly-derived load situation continuously exceeded a predetermined reference value predetermined number times, or the average value thereof exceeded a predetermined reference value. In a case where the condition set in this step is not met, the processes subsequent to the step A4 are not performed.

Figure 4:
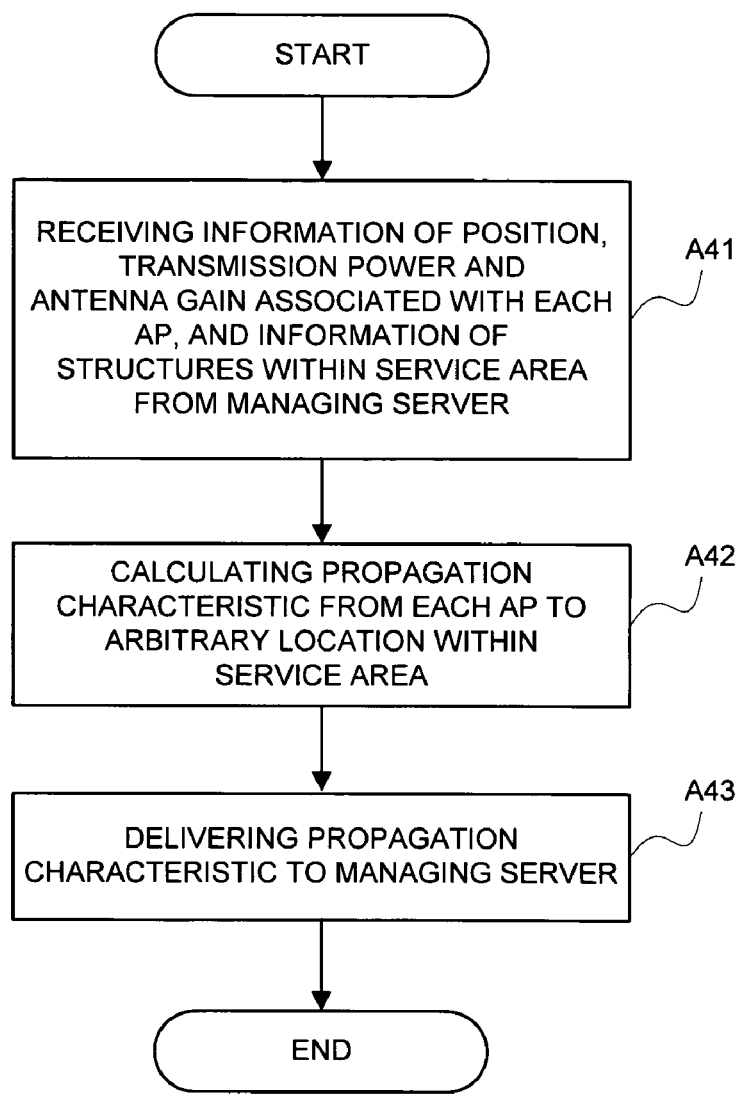
FIG. 4 is a flowchart illustrating the details of the propagation characteristic acquiring process A4 of FIG. 3.
Figure 5:
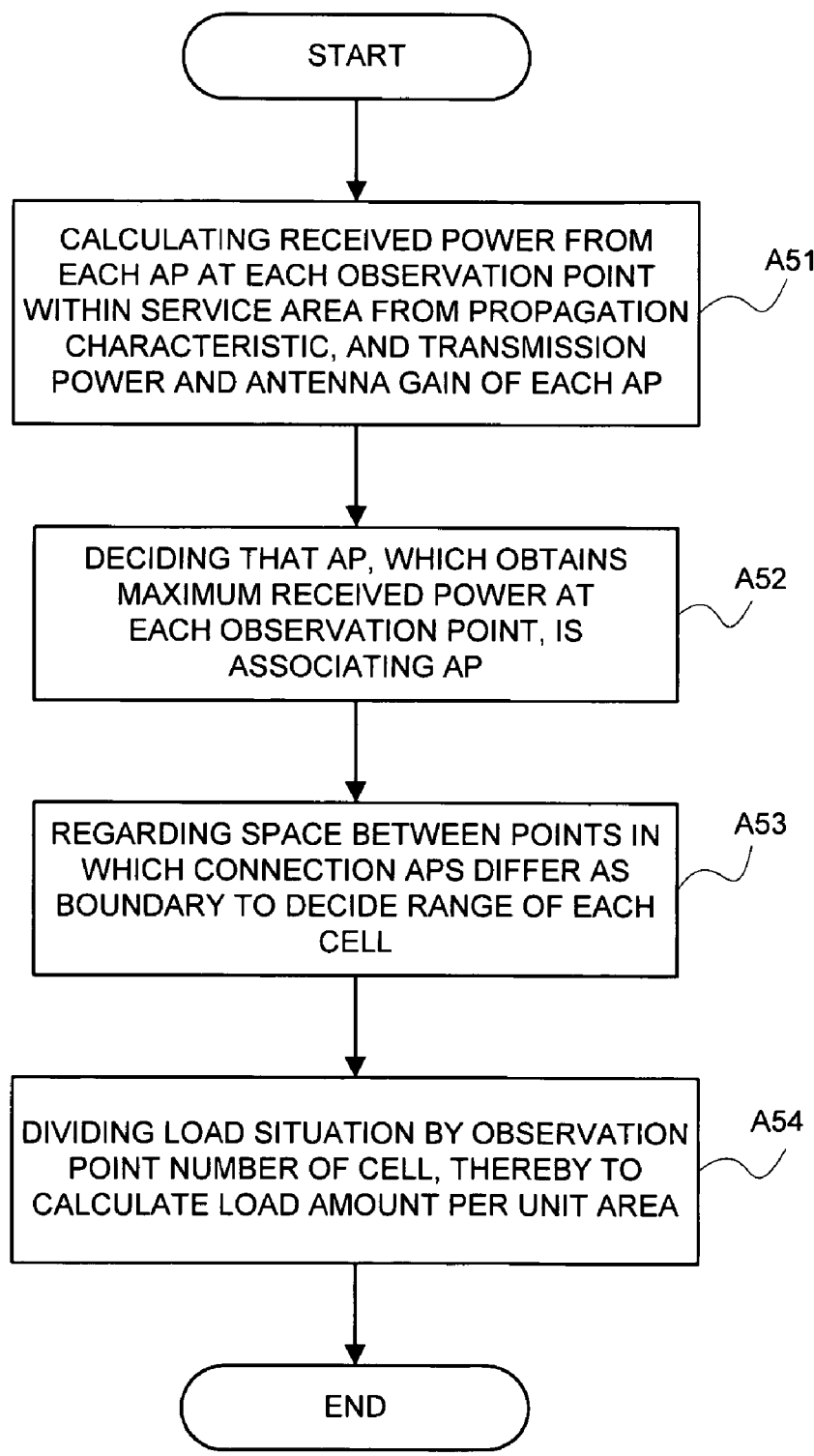
FIG. 5 is a flowchart illustrating the details of the load situation grasping process A5 for each cell of FIG. 3.

The step A4 is an acquiring process of the propagation characteristic. In this step, a process of deriving the propagation characteristic from each AP to an arbitrary location is performed in a service area that becomes an object of management. This is for grasping the propagation characteristic of the cell that is a coverage range of each AP. The process of acquiring the propagation characteristic is performed according to a flow shown in FIG. 4. That is, information associated with the position of each AP and information of structures (a building, a utensil, etc.) that exist in the service area of the system are supplied from the propagation characteristic acquiring section 14 of the managing server 1 to the propagation characteristic calculating server 3 (step A41). In the propagation characteristic calculating server 3, by employing these kinds of information that were given, the propagations characteristic (for example, a pass loss and a delay spread) from each AP to an arbitrary location within the service area of the system is computed by means of well-known techniques such as a simple propagation model technique (for example, exponential attenuation model etc.) and a ray-tracing technique (step A42).

Figure 6:
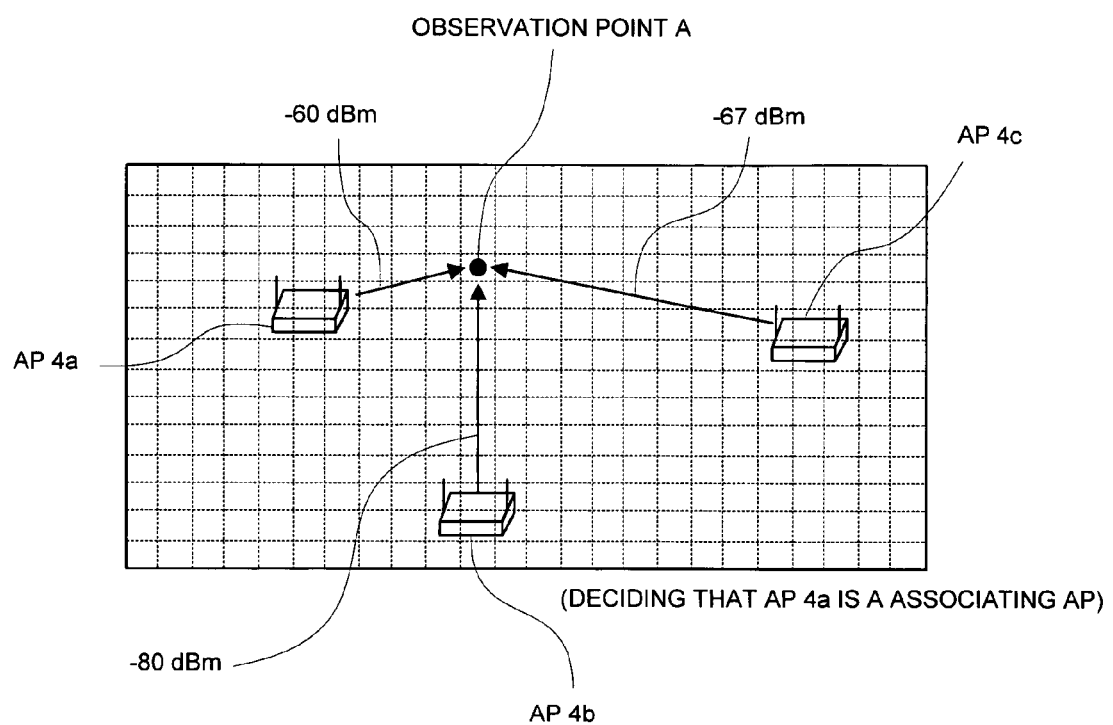
FIG. 6 is a view for explaining how the associating AP is decided.

Additionally, a reference to FIG. 6 is made, in which the so-called arbitrary location within the service area from each AP is one that points to an arbitrary observation point A (one of a plurality of minute areas to be obtained by partitioning the above service area in a lattice shape) within the service area (which is assumed to be rectangular in the figure) of a certain wireless LAN system. The propagation characteristic calculated in such a manner is delivered to the propagation characteristic acquiring section 14 of the managing server 1 (step A43).

A step A5 in FIG. 3 is a grasping process of the load situation for each cell, and this process, which is performed in the load situation controlling section 11 within the managing server 1, is a process of grasping the situation of the load in details at each location within the service area. The load situation per the unit area (the minute area of FIG. 6) within the service area is derived, based upon the propagation characteristic found in the step A4 and the load situation derived in the step A2. At first, on the basis of the propagation characteristic found in the step A4, by using the transmission power and an antenna gain of each AP, the received power from each AP is calculated in a minute area A that is an arbitrary observation point within the service area shown in FIG. 6 (step A51).

Upon deciding an associating AP, whose received power is maximum in all APs at each observation point (step A52), the service area is partitioned with each formed by clustering observation points which associate to the AP of the cell (see FIG. 7) (step A53). Herein, the associating AP is explained, in which each terminal carries out an association (connection process) for one AP because it makes communication in the wireless LAN, the AP for which the terminal carried out the association is called a associating AP, and at the moment that the terminal makes communication, it does so via this associating AP.

Figure 7:
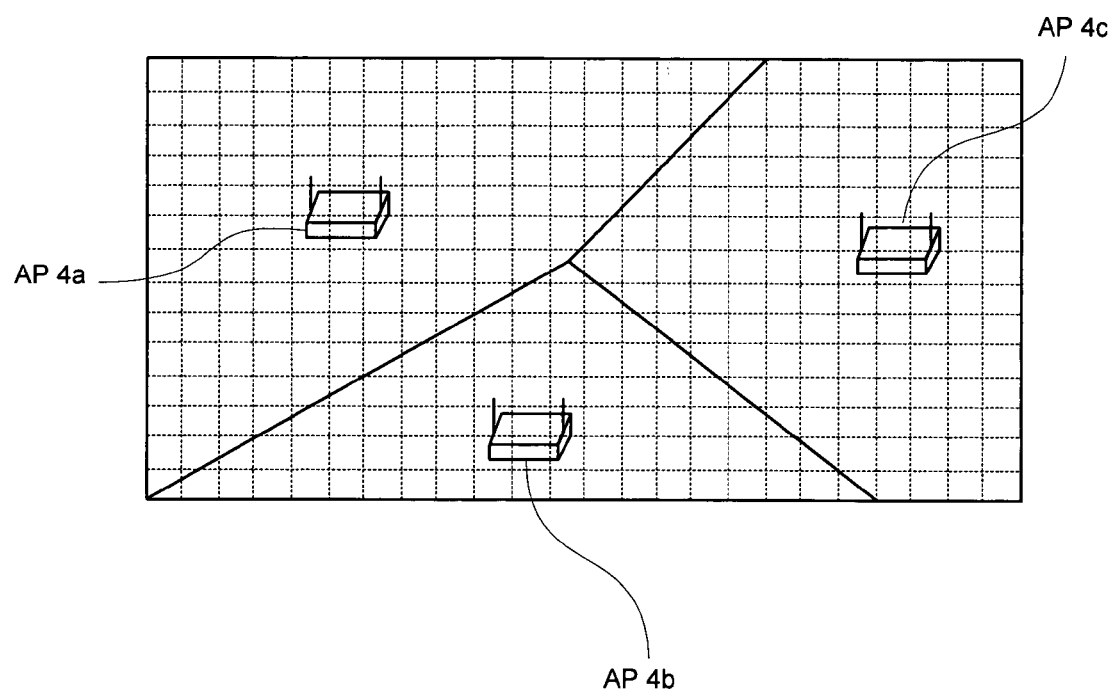
FIG. 7 is a view illustrating the entirety of the service area and the boundary of the cell that each AP covers.

In the steps A1 and A2, a total of the load situations of a certain AP and terminals connected to its AP can be acquired. As shown in FIG. 7, when the cell that each AP covers is decided, it can be supposed that the terminals connected to a certain AP exist within the cell of the above AP. Hence, the total of the load situations of the above AP and the terminals connected to its AP can be regarded as an equivalent of the load situation of the above cell (the cell of the above AP). Thereupon, a value of dividing the above load situation by an area of its cell (or the number of minute areas to be included in it) is considered as an amount of the load per the unit area (step A54).

Figure 8:
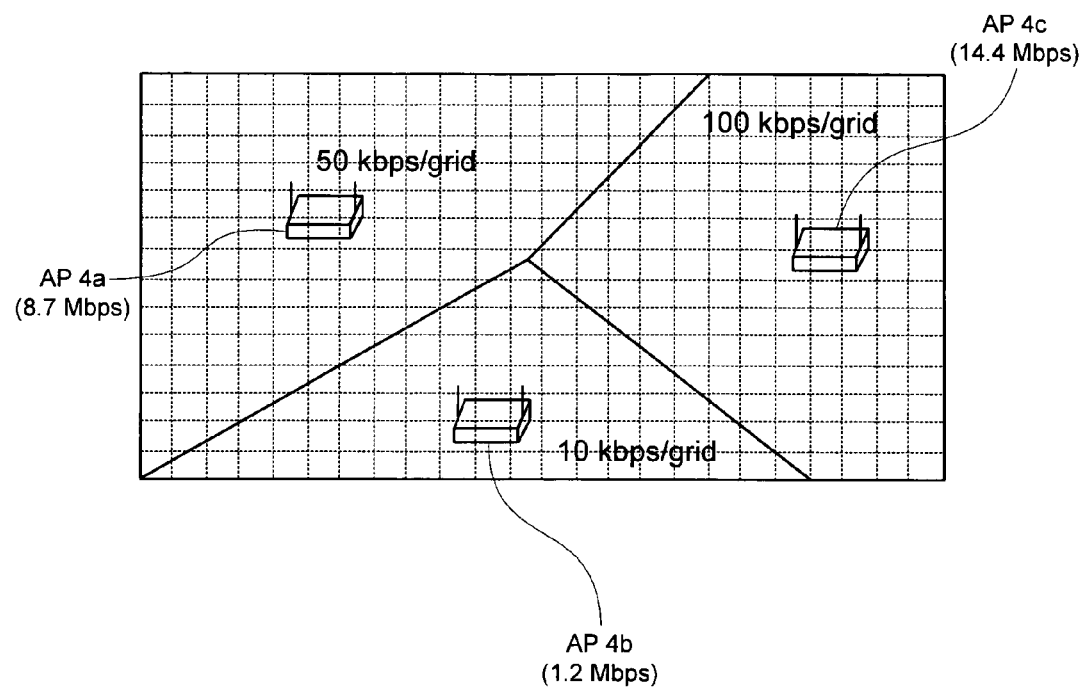
FIG. 8 is a view illustrating the total load at each cell and the load per the unit area.

A relation between the acquired load situation and the load per the unit area is one shown in, for example, FIG. 8. The identical figure shows a situation in which a total of the loads of the AP 4a and the terminals associated to this AP 4a is 8.7 Mbps, a total of the loads that occur in the AP 4b and the terminals connected to this AP 4b is 1.2 Mbps, and a total of the loads that occur in the AP 4c and the terminals connected to this AP 4c is 14.4 Mbps. In this case, loads per unit area are calculated, by dividing the load at each of these cells by the area of each cell (i.e. the number of minute areas in each cell), 50 kbps, 10 kbps, and 100 kbps respectively. Note that the minute area is called as grid in the figure.

Figure 9:
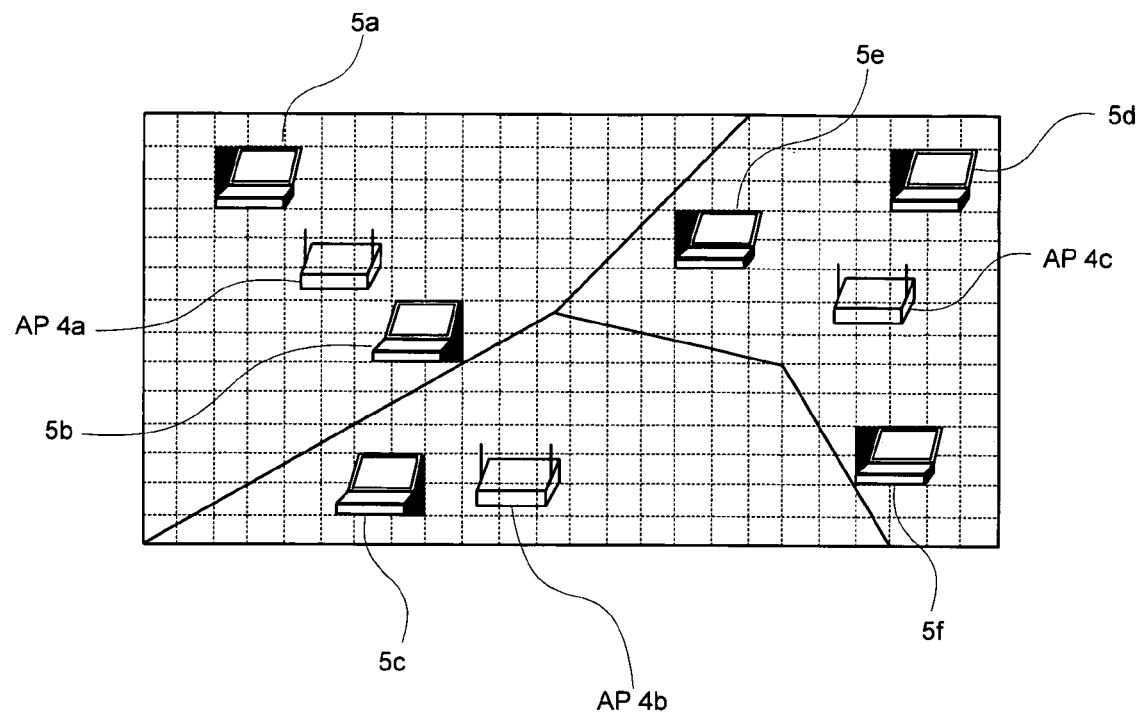
FIG. 9 is a view illustrating the situation where the load occurs only at the position in which the terminal exists.

In the step A1, in a case where the load information can be acquired terminal by terminal and further the position information of the terminal can be acquired, the load per the unit area within the cell is not assumed to be equal, but it may be considered that as shown in FIG. 9, the load occurs only in the location painted black, i.e. in the vicinity of the position in which the terminal exists and the load does not occur in the position in which no terminal exists. If the position and load for each terminal can be reflected in such a manner, the more detailed load situation can be grasped. As mentioned above, the occurrence situation of the load for each location in the service area is grasped.

A step A6 in FIG. 3 is a planning/deciding process of the load situation control content, and this process, which is executed in the load situation controlling section 11 within the managing server 1, is a process of planning/deciding the controlling process of the appropriate load situation i.e. the load situation for allotting the load AP by AP by the simulation on the basis of the load situation grasped in the step A5. In the present invention, the control of the load situation is executed by changing the shape and size of the cell of each AP. Changing the shape and size of the cell causes the number of the connectable terminals hereto to be changed and the load applied to each AP to be changed, thereby enabling the altering control of the load situation of each AP.

In a case where the parameter of the AP was changed, it can be inferred how the cell changes and how the load to be accommodated changes because the propagation characteristic from each AP to each observation point within the cell was clarified in the step A4 and the load situation at each point was clarified in the step A5 respectively. In this step, the control is executed by utilizing the above mechanism, supposing that the parameter of the AP is changed so that the load situation of each AP becomes suitable. The practical methods for executing the load controlling are the following three items; modification of transmission power of AP, modification of installation position of AP and employment of additional AP.

Figure 10:
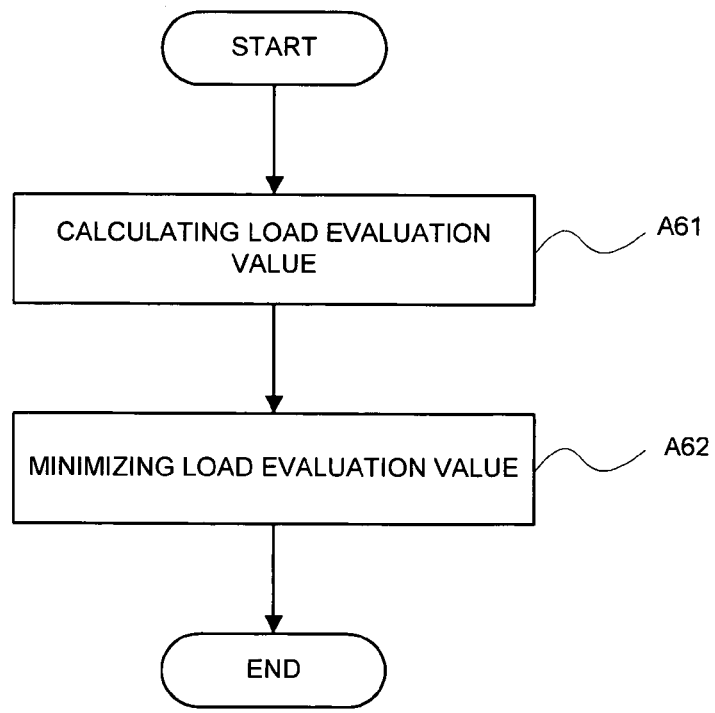
FIG. 10 is a flowchart illustrating the details of the planning/deciding process A6 of the load situation control content of FIG. 3.

A reference to FIG. 10 is made, in which a flow illustrating the details of the step A6 of FIG. 3 exists, and the planning/deciding process of the load situation control content will be explained, by making a reference to this figure. A load evaluation value is introduced as a technique of appropriately controlling the load situation of each AP. A first example of this load evaluation value is a variance of the total load of each cell, and minimizing this variance causes the load of each AP to be equalized, thus enabling the load balancing. A second example of this load evaluation value is a number of the cells of which the load exceeds an allowable load amount, and minimizing this cell number allows the load distribution to be realized. A third example of this load evaluation value is a variance of a ratio of an ideally-allotted load amount and a measured load amount, and minimizing this variance allows equalization of the load to be realized responding to the ideally-allotted load amount.

Accordingly, the foregoing load evaluation value is calculated in a step A61, and such a parameter that the above load evaluation value is minimized while changing the parameter of each AP is found in a next step A62.

For example, in a case of controlling the transmission power, the load evaluation value is derived to be minimized by re-calculating all patterns of the cells by the simulation with all patterns of transmission power of each AP. The transmission power of each AP to minimize the load evaluation value derived in such a manner is notified to the parameter section 16 for taking control.

Herein, in a case of minimizing the variance of the total load of each cell as the load evaluation value, an example of a practical controlling method by the transmission power control is illustrated. At first, by computing the load in the entirety of the service area to divide the entirety of the loads of the APs by the AP number, the load amount (hereinafter, referred to as an equal load amount) that each AP should accommodate equally is calculated. Paying an attention to one AP to which a load larger than the equal load amount was applied, a simulation of gradually lessening the transmission power of this AP is assumed to carry out. Lessening the transmission power causes the cell of the above AP to be shrunk, so the load to be accommodated in it is decreased. The transmission power is lessened until the load applied to the above AP becomes the equal load amount. By repeating such a process, regulation is made so that the accommodated load of each AP becomes equal.

For example, it is assumed that a distribution of the traffic as shown in FIG. 8 was derived in the step A4. The identical figure shows that: as to the cell of the AP 4a, the traffic of 8.7 Mbps occurred in the entirety of its cell and the traffic amount per the unit area (grid) is 50 kbps; as to the cell of the AP 4b, the traffic of 1.2 Mbps occurred in the entirety of its cell and the traffic amount per the unit area (grid) is 10 kbps; and as to the cell of the AP 4c, the traffic of 14.4 Mbps occurred in the entirety of its cell and the traffic amount per the unit area (grid) is 100 kbps. Assuming that the traffic amount that can be accommodated per one AP is 10 Mbps, it is said that the AP 4c is in an overload state and the AP 4b has a large margin. Thereupon, lessening the transmission power of the AP 4c that is in an overload state, and increasing the transmission power of the AP 4b having a margin make it possible to shrink the cell size of the AP 4c, and to expand the cell size of the AP 4b, respectively.

Figure 11:
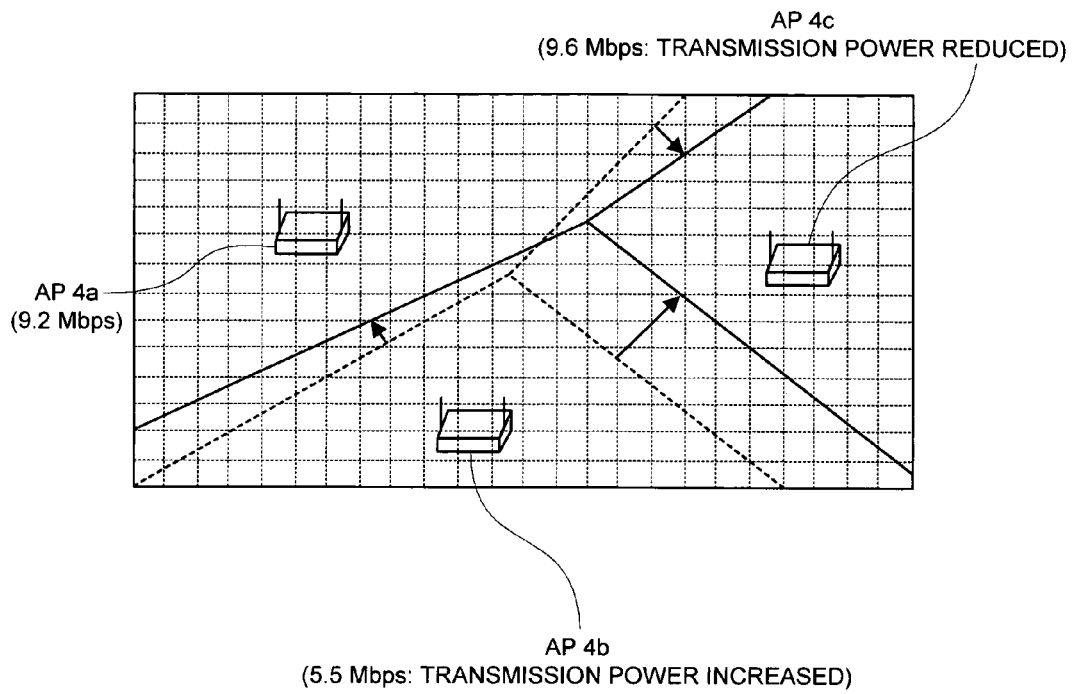
FIG. 11 is a view illustrating a change in the cell boundary and the accommodated load in a case where the transmission power of each AP was changed.

The above operation causes to change an associating AP at observation points, and the shape of the cell that is a range to be covered by each AP is changed if the transmission power of the AP is changed. As a result, it can be supposed that the loads of respective cells are changed as shown in FIG. 11 and the overload state of the AP 4c is removed.

Herein, in a case where a reception quality against noise is expected to decline when the transmission power was lowered, causing all APs to equally increase the transmission power makes it possible to enhance the quality against the noise without changing the allotment of the cell. After such transmission power that the load in each AP became equal was derived, by employing the simulation in such a manner, the load situation controlling section 11 provides the transmission power of each AP that was decided for the parameter controlling section 16, and performs a process of actually making a resetting for each AP in a next step (A7 of FIG. 3). Additionally, in a case where the transmission power of the AP is impossible to alter via the network and has to be altered manually, information associated with the transmission power is provided not for the parameter controlling section 16, but for the measure notifying section 15.

Additionally, depending upon the performance and policy of the AP, a load allocating method may be employed in which the load of each AP is not assumed to be equal, but each AP is weighted differently. In this case, the load amount that the AP should accommodate is not one that is decided by simply dividing the entirety of the load by the AP number, but may be decided by employing a method of, after dividing the entirety of the load by a total of weights, multiplying its acquired value by the weight of each AP respectively. For example, assuming that the AP 4a, the AP 4b and the AP 4c can accommodate the load at a ratio of the weight of 1:2:3 respectively, and that the load of 12 Mbps exists as a whole, the allotment amount of the load of the AP 4a is given as $$12\ Mbps \times 1/(1+2+3) = 2\ Mbps,$$

and the allotment amount of the load of the AP 4b and the AP 4c becomes 4 Mbps and 6 Mbps respectively.

In a case where, for example, the APs having different accommodation amounts were used in one system (in such a case that the APs of the IEEE802.11a and 802.11b coexist), such a control is one of the effective controls in such a case that each AP is caused to have a different load allotment amount respectively. With the 802.11a, the maximum accommodation amount is 54 Mbps, and with the 802.11b, it is 11 Mbps, so a simple computation is performed, in which they differ by a fact of approx. five in the accommodation amount.

Now think that the transmission power control is taken in a case of minimizing the number of the cells (APs) of which the load amount exceeds an allowable load amount as the load evaluation value, the load situation in each AP is derived to extract the AP of which the load amount exceeds an allowable load amount. In the simulation, information associated with a boundary of the cell of each AP is re-calculated while lessening the transmission power of this extracted APs to find out the transmission power with which the load to be accommodated by the extracted AP becomes an allowable load amount. Further, in a case where the AP of which the load amount exceeds an allowable load amount still exists, the similar process is repeated, and the process is repeated until the load that each AP accommodates comes not to exceed an allowable load amount. Also, a control is taken in the previous control so that the transmission power of the extracted AP is lowered and simultaneously, the power of the AP having a margin of the load is increased in such a range that the allowable load amount is not exceeded.

When the reception quality against the noise is expected to decline as a result of lessening the transmission power, by increasing the transmission power of all APs equally, enhancement of the quality against the noise is enabled without changing the cell boundary. By using the simulation, such each transmission power that the load amount of each AP becomes equal to or less than the allowable load amount is derived. The parameter controlling section 16 notifies each AP so as to set to the derived transmission power. Additionally, there is also a case where the allowable load amount differs AP by AP.

Figure 12:
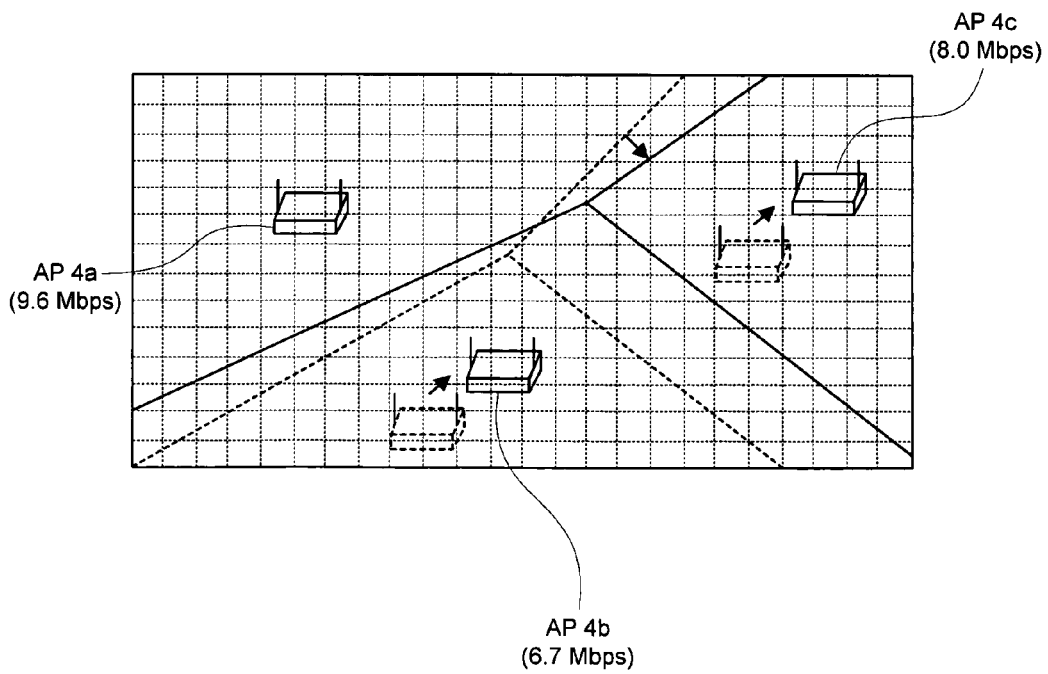
FIG. 12 is a view illustrating a change in the cell boundary and the accommodated load in a case where the installation position of each AP was altered.

Next, a controlling method of changing the installation position of the AP will be explained. A method can be employed of shifting the position of the installed AP, thereby to change the shape of the cell, and to alleviate the load concentration. By simulating a change in the cell in a case where the installation position was changed, and the load evaluation value accompanying it, the AP installation position in which this load evaluation value is minimized is decided. For example, it is expected that, in the situation of FIG. 8, by changing the positions of the AP 4b and the AP 4c as shown in FIG. 12, the cell shape of each AP is changed and the load concentration is alleviated. The load situation controlling section 11 provides a new installation position of each AP that was decided for the measure notifying section 15, and performs a process of actually making a notification in a next step.

Next, a controlling method of adding the AP will be explained. Simulating a change in the cell shape in a case where the AP was added and a change in the accommodated traffic amount of each AP based on the results of the step A4 and the step A5 makes it possible to plan/decide an appropriate instruction for adding the AP. For example, in the situation of FIG. 8, the boundary of the cell in a case where the AP was added to all locations (minute areas) to which the AP was able to be newly added and the accommodated load of each AP at this moment are re-calculated by the simulation. For the transmission power of an AP at this moment, a default value of the above AP may be employed, and the average power of the already-installed APs may be employed. It is decided that the AP is installed at the location in which the load evaluation value is minimized, out of the locations (minute areas) to which the AP can be added.

Figure 13:
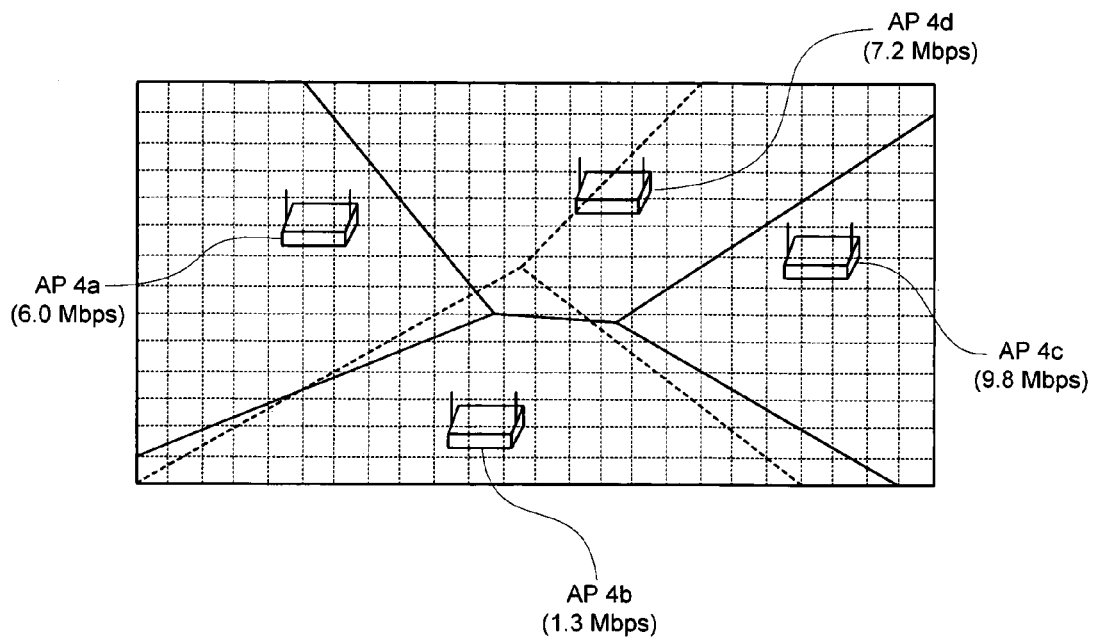
FIG. 13 is a view illustrating a change in the cell boundary and the accommodated load in a case where the new AP was added.

For example, if it is assumed that the location in which the load evaluation value was minimized was the location of AP 4d as shown in FIG. 13, it is expected that the overload the AP 4c is removed because the added AP 4d mainly accommodates a part of the load applied to the AP 4a and the AP 4c. Additionally, in a case of adding the AP, a channel of the added AP has to be also considered. As to the channel of the added AP, the channel with which interference received from the other cells is minimized in the location to which the AP is added is desirably selected. For example, the channel with which a total of the received power in the addition location (a total of the received power from a plurality of the APs using an identical channel) is minimized is selected on the basis of the already-acquired propagation characteristic of each AP.

The load situation controlling section 11 provides information associated with addition of the new AP that was decided for the measure notifying section 15, and performs a process of actually making a notification. A step A7 of FIG. 3 is a load situation control executing/measure notifying process, in which the load situation controlling process decided in the step A6 is actually executed, or a notification is made for urging its execution (including suggestion as well). There is a case where the control of the transmission power described in the step A6 can be automatically taken via the network, so the load balancing process is directly performed in this case (which is processed in the parameter controlling section 16). On the other hand, in a case where the transmission power can be set only manually, a manpower process is necessitated in changing the installation position of the AP and in adding the AP, so a process of making a notification for urging its operation is performed (which is processed in the measure notifying section 15).

Hereinafter, a case of performing the process in the parameter controlling section 16 and a case of performing the process in the measure notifying section 15 will be explained separately. With the process by the parameter controlling section 16, the process in a case where for the parameter controlling section 16, the setting value of the transmission power of each AP is provided by the load situation controlling section 11 in the step A6 will be described. The parameter controlling section 16 resets the setting value of the transmission power of each AP to the provided value of the transmission power. The parameter controlling section 16 sets the provided value of the transmission power for the designated AP by employing the management protocol such as the SNMP. Thereafter, in order to notify the effect that the transmission power was reset to the administrator, the parameter controlling section 16 provides information indicating that the transmission power was altered for the displaying apparatus 2, and the displaying apparatus 2 displays the above information to the administrator.

The measure notifying section 15 was already notified of the process that should be performed by the load situation controlling section 11 in the step A6. The process to be notified to the measure notifying section 15 is a process of urging the operation administrator to execute the above control because its process is impossible to control automatically and has to be performed via a human hand (for example, to change the transmission power manually, to change the installation position of the AP, and to add the AP). The measure notifying section 15 provides the process content notified by the load situation controlling section 11 for the displaying apparatus 2, and the displaying apparatus 2 displays it to the operation administrator.

Figure 14:
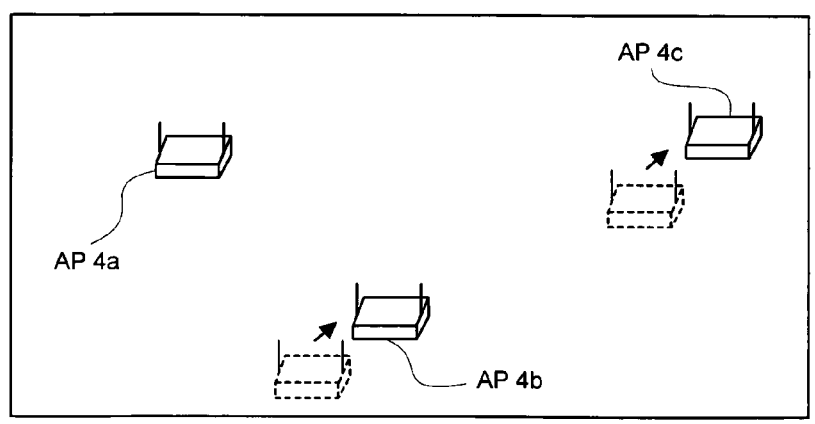
FIG. 14 is a view illustrating the display for urging the operation administrator to move the AP in order to take the load situation control.
Figure 15:
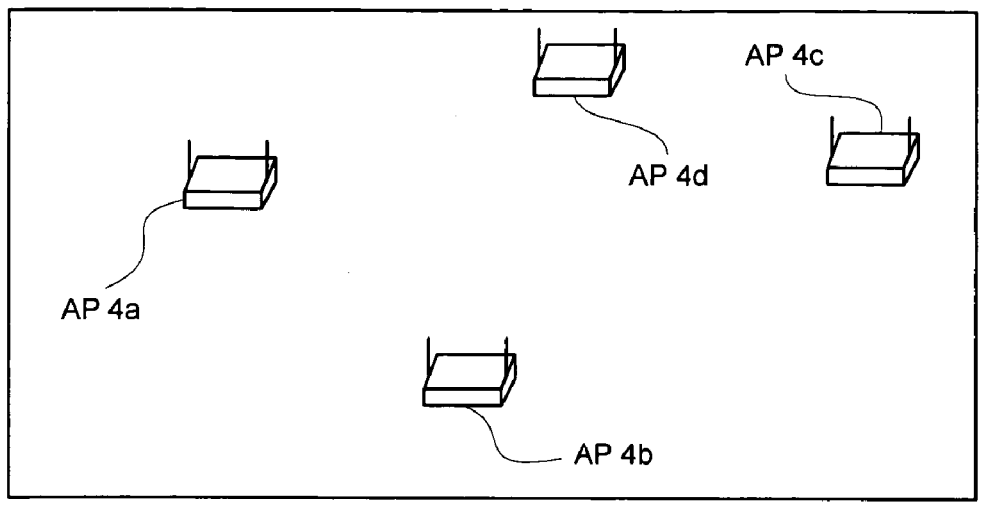
FIG. 15 is a view illustrating the display for urging the operation administrator to add the AP in order to take the load situation control.

For example, in a case where a decision was made in the step A6 so that the installation position of the AP was changed, the displaying apparatus 2 displays the figure like FIG. 14, thereby allowing the AP that is caused to move and its movement destination to be easily recognized. Also, in a case where a decision was made in the step A6 so that the AP was added, the displaying apparatus 2 displays the figure like FIG. 15, thereby making it possible to easily recognize which position the AP should be added to.

As mentioned above, after collecting the load information from the wireless LAN devices to clarify the cell of each AP by the load balancing system of the present invention, the method for taking the load situation control is decided by the simulation, and the actual load situation control is taken or the operation administrator is urged to execute the process for the load situation control, thereby enabling the load distribution of the wireless LAN system under operation.

Figure 16:
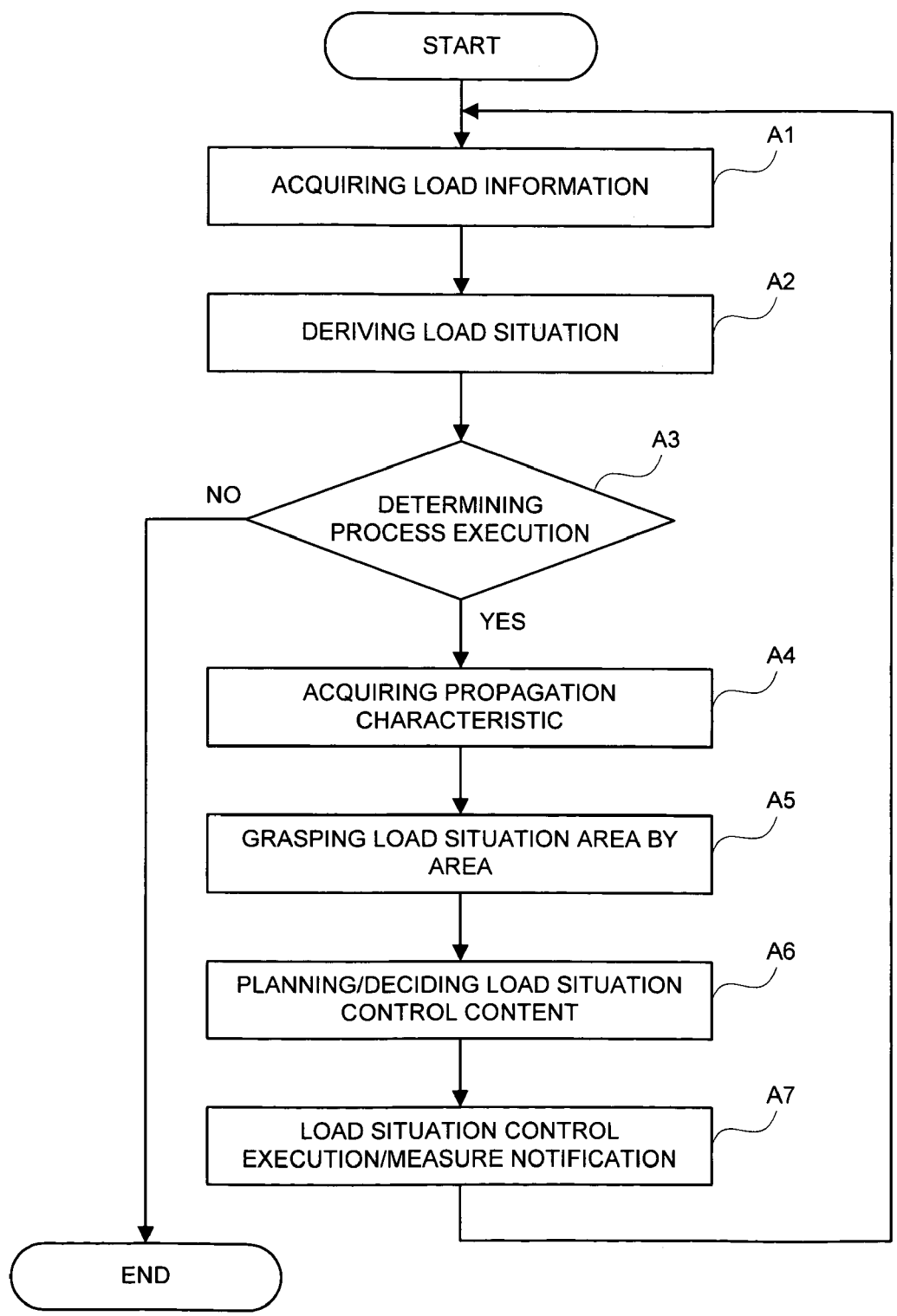
FIG. 16 is a flowchart illustrating the operation of another embodiment of the present invention.

FIG. 16 is an operational flowchart of another embodiment of the present invention, and parts identical to FIG. 3 are shown with identical codes. In this embodiment, after the controlling measure of the load situation was executed with the load situation controlling execution/measure notification in the step A7, it is confirmed whether the above measure was suitably executed by carrying out a feedback. That is, after the step A7, the operation returns to the step A1, passes through the step A2, the process execution determination is made in the step A3, and if it is determined that the load situation was suitably controlled, the operation ends, otherwise, the processes subsequent to the step A4 are repeated.

Figure 17:
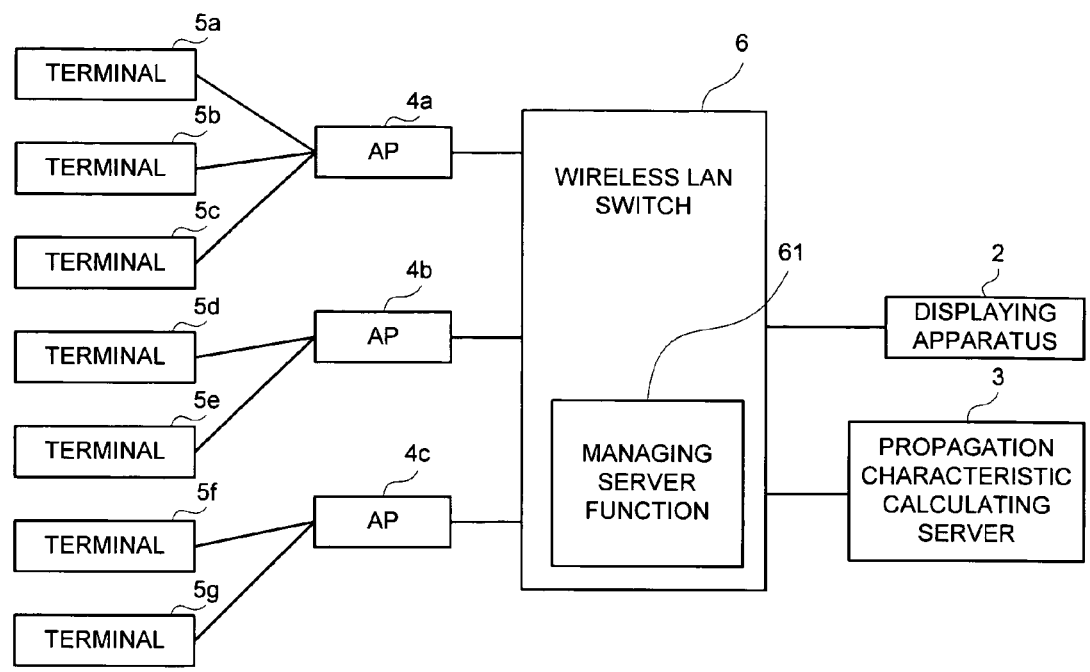
FIG. 17 is a system view illustrating the configuration of yet another embodiment of the present invention.

FIG. 17 is a system block diagram illustrating yet another embodiment of the present invention, and parts identical to FIG. 1 are shown with identical codes. In a case of using a LAN switch 6 that specialized in the wireless LAN, the LAN switch 6 is one caused to have a managing server function 61 because this LAN switch 6 has a management function of the AP. Doing so eliminates a necessity for making the managing server another hardware component, thus enabling the scale of the hardware to be reduced.

Additionally, the operational flow in each embodiment mentioned above can be realized, by making a configuration so that its operational procedure is recorded in a record medium as a program to cause a computer to read and execute it.

What is claimed is:

1. A management method of a radio communication system including a plurality of wireless base stations, said management method comprising:

a first step of grasping a communication traffic load situation for each cell that is a coverage range of each of said plurality of said wireless base stations, calculated as an amount of communication traffic load per unit area, the traffic load per unit area being derived on the basis of a propagation characteristic using the transmission power and antenna gain of each base station; and a second step of calculating a communication traffic load evaluation value defined for evaluating said communication traffic load situation of said wireless base stations based on said communication traffic load situation and controlling said communication traffic load situation based on said calculated communication traffic load evaluation value, to control a cell shape and size such that said radio resource load situation of each said cell becomes suitable, said cell shape and size being determined by propagation characteristics and parameters of the wireless base station, said communication traffic load evaluation value being based on a correspondence between a predetermined allotted-load amount and an actually-measured communication traffic load amount of each said cell.

2. The management method according to claim 1, wherein said communication traffic load evaluation value is a variance of a total load amount of each said cell.

3. The management method according to claim 1, wherein said communication traffic load evaluation value is a number of the cells of which the communication traffic load amount exceeds an allowable communication traffic load amount.

4. The management method according to claim 1, wherein said communication traffic load evaluation value is a variance of a ratio of the predetermined allotted-load amount and the actually-measured communication traffic load amount of each said cell.

5. The management method according to claim 1, wherein said second step is a step of controlling so that said communication traffic load evaluation value is minimized.

6. The management method according to claim 1, wherein said second step is a step of controlling a transmission power of said wireless base stations.

7. The management method according to claim 1, wherein said second step is a step of suggesting installation positions of said wireless base stations.

8. The management method according to claim 1, wherein said second step is a step of suggesting additions of said wireless base stations.

9. The management method according to claim 1, wherein said first step is a step of changing a time interval for grasping said communication traffic load situation.

10. A management method of a radio communication system including a plurality of wireless base stations, said management method comprising:

a first step of grasping a communication traffic load situation for each cell that is a coverage range of each of said plurality of said wireless base stations, calculated as an amount of communication traffic load per unit area, the traffic load per unit area being derived on the basis of a propagation characteristic using the transmission power and antenna gain of each base station; and a second step of controlling a cell shape and size such that said communication traffic load situation of each said cell becomes suitable, said cell shape and size being determined by propagation characteristics and parameters of the wireless base station, said communication traffic load situation being evaluated based on a communication traffic load evaluation value that is based on a correspondence between a predetermined allotted-load amount and an actually-measured communication traffic load amount of each said cell.

11. The management method according to claim 10, wherein said first step is a step of changing a time interval for grasping said communication traffic load situation.

12. The management system according to claim 10, wherein said communication traffic load evaluation value is a variance of a ratio of the predetermined allotted communication traffic load amount and the actually-measured communication traffic load amount of each said cell.

13. The management system according to 10, wherein said second means comprises means for controlling so that said communication traffic load evaluation value is minimized.

14. A management system of a radio communication system including a plurality of wireless base stations, said management system comprising:

a first means for grasping a communication traffic load situation for each cell that is a coverage range of each of said plurality of said wireless base stations, calculated as an amount of communication traffic load per unit area, the traffic load per unit area being derived on the basis of a propagation characteristic using the transmission power and antenna gain of each base station; and a second means for calculating a communication traffic load evaluation value defined for evaluating said communication traffic load situation of said wireless base stations based on said communication traffic load situation and controlling said communication traffic load situation based on said calculated communication traffic load evaluation value, to control a cell shape and size such that said radio resource load situation of each said cell becomes suitable, said cell shape and size being determined by propagation characteristics and parameters of the wireless base station, said communication traffic load evaluation value being based on a correspondence between a predetermined allotted-load amount and an actually-measured communication traffic load amount of each said cell.

15. The management system according to claim 14, wherein said communication traffic load evaluation value is a variance of a total communication traffic load amount of each said cell.

16. The management system according to claim 14, wherein said communication traffic load evaluation value is a number of the cells of which the communication traffic load amount exceeds an allowable communication traffic load amount.

17. The management system according to claim 14, wherein said second means comprises means for controlling a transmission power of said wireless base stations.

18. The management system according to claim 14, wherein said second means comprises means for suggesting installation positions of said wireless base stations.

19. The management system according to claim 14, wherein said second means comprises means for suggesting additions of said wireless base stations.

20. A management system of a radio communication system including a plurality of wireless base stations, said management system characterized in grasping a communication traffic load situation for each cell that is a coverage range of each of said plurality of said wireless base stations, calculated as an amount of communication traffic load per unit area, the traffic load per unit area being derived on the basis of a propagation characteristic using the transmission power and antenna gain of each base station, to control a cell shape and size such that said communication traffic load situation of each said cell becomes suitable, said cell shape and size being determined by propagation characteristics and parameters of the wireless base station, said communication traffic load situation being evaluated based on a communication traffic load evaluation value that is based on a correspondence between a predetermined allotted-load amount and an actually-measured communication traffic load amount of each said cell.

21. A management apparatus of a radio communication system including a plurality of wireless base stations, said management apparatus comprising:

means for, based on a communication traffic load situation for each cell that is a coverage range of each of said plurality of said wireless base stations, calculated as an amount of communication traffic load per unit area, the traffic load per unit area being derived on the basis of a propagation characteristic using the transmission power and antenna gain of each base station, calculating a communication traffic load evaluation value defined for evaluating said communication traffic load situation of said wireless base stations and means for controlling said communication traffic load situation based on said communication traffic load evaluation value, to control a cell shape and size such that said radio resource load situation of each said cell becomes suitable, said cell shape and size being determined by propagation characteristics of the wireless base station, said communication traffic load evaluation value being based on a correspondence between a predetermined allotted-load amount and an actually-measured communication traffic load amount of each said cell.

22. The management apparatus according to claim 21, wherein said means for controlling comprises means for controlling said communication traffic load situation so that said communication traffic load evaluation value is minimized.

23. A management apparatus of a radio communication system including a plurality of wireless base stations, said management apparatus comprising:

means for grasping a communication traffic load situation for each cell that is a coverage range of each of said plurality of said wireless base stations, calculated as an amount of communication traffic load per unit area, the traffic load per unit area being derived on the basis of a propagation characteristic using the transmission power and antenna gain of each base station, and means for controlling a cell shape and size such that said communication traffic load situation of each said cell becomes suitable, said cell shape and size being determined by propagation characteristics and parameters of the wireless base station, said communication traffic load situation being evaluated based on a communication traffic load evaluation value that is based on a correspondence between a predetermined allotted-load amount and an actually-measured communication traffic load amount of each said cell.

24. A computer-readable medium storing a program for causing a computer to execute an operation of a management apparatus of a radio communication system including a plurality of wireless base stations, said program comprising a process of, based on a communication traffic load situation for each cell that is a coverage range of each of said plurality of said wireless base stations, calculated as an amount of communication traffic load per unit area, the traffic load per unit area being derived on the basis of a propagation characteristic using the transmission power and antenna gain of each base station, calculating a communication traffic load evaluation value defined for evaluating said communication traffic load situation of said wireless base stations to control said communication traffic load situation based upon this calculation result, to control a cell shape and size such that said radio resource load situation of each said cell becomes suitable, said cell shape and size being determined by propagation characteristics and parameters of the wireless base station, said communication traffic load evaluation value being based on a correspondence between a predetermined allotted-load amount and an actually-measured communication traffic load amount of each said cell.

25. A computer-readable medium storing a program for causing a computer to execute an operation of a management apparatus of a radio communication system including a plurality of wireless base stations, said program comprising a process of grasping a communication traffic load situation for each cell that is a coverage range of each of said plurality of said wireless base stations, calculated as an amount of communication traffic load per unit area, the traffic load per unit area being derived on the basis of a propagation characteristic using the transmission power and antenna gain of each base station, to control a cell shape and size such that said radio resource load situation of each said cell becomes suitable, said cell shape and size being determined by propagation characteristics and parameters of the wireless base station, said communication traffic load situation being evaluated based on a communication traffic load evaluation value that is based on a correspondence between a predetermined allotted-load amount and an actually-measured communication traffic load amount of each said cell.

* * * * *